United States Patent [19]
Gallagher, Jr.

[11] Patent Number: 5,496,425
[45] Date of Patent: * Mar. 5, 1996

[54] COLD FORMED HIGH-STRENGTH STEEL STRUCTURAL MEMBERS

[75] Inventor: Hugh M. Gallagher, Jr., Cincinnati, Ohio

[73] Assignee: Consolidated Metal Products, Inc., Cincinnati, Ohio

[ * ] Notice: The portion of the term of this patent subsequent to Dec. 17, 2012, has been disclaimed.

[21] Appl. No.: 276,217

[22] Filed: Jul. 15, 1994

Related U.S. Application Data

[63] Continuation-in-part of Ser. No. 992,123, Dec. 17, 1992, Pat. No. 5,330,594, which is a continuation-in-part of Ser. No. 848,646, Mar. 9, 1992, Pat. No. 5,236,520, which is a continuation-in-part of Ser. No. 602,675, Oct. 24, 1990, Pat. No. 5,094,698.

[51] Int. Cl.$^6$ .................................................... C21D 7/02
[52] U.S. Cl. ............................ 148/651; 72/364; 72/700
[58] Field of Search ....................... 72/364, 700; 148/651

[56] References Cited

U.S. PATENT DOCUMENTS

| | | |
|---|---|---|
| 1,862,281 | 6/1932 | Schaefer . |
| 2,767,836 | 10/1956 | Nachtman et al. . |
| 2,767,837 | 10/1956 | Nachtman et al. . |
| 2,880,855 | 4/1959 | Nachtman . |
| 2,953,794 | 9/1960 | Klooz . |
| 3,001,897 | 9/1961 | Nachtman . |
| 3,066,408 | 12/1962 | Fader . |
| 3,076,361 | 2/1963 | Epstein et al. . |
| 3,557,587 | 1/1971 | Cardillo . |
| 3,573,999 | 4/1971 | Gokyu . |
| 3,720,087 | 3/1973 | Gottschlich . |
| 3,877,281 | 4/1975 | Shimizu et al. . |
| 3,904,445 | 9/1975 | Gallagher, Jr. . |
| 3,908,431 | 9/1975 | Jones et al. . |
| 4,289,548 | 9/1981 | Bucher et al. . |
| 4,312,210 | 1/1982 | Nishizawa et al. . |
| 4,317,355 | 3/1982 | Hatsuno et al. . |
| 4,608,851 | 9/1986 | Khare . |
| 4,805,437 | 2/1989 | Heil, Jr. et al. . |
| 5,330,594 | 7/1994 | Gallagher, Jr. ........................ 148/651 |

FOREIGN PATENT DOCUMENTS

| | | |
|---|---|---|
| 0093218A1 | 11/1983 | European Pat. Off. . |
| 2218399 | 2/1974 | France . |
| 3474743A1 | 4/1986 | Germany . |
| 51-144328A | 12/1976 | Japan . |
| 58-027958 | 2/1983 | Japan . |
| 1535775 | 12/1978 | United Kingdom . |

OTHER PUBLICATIONS

*High–Tensile Bolts* by Kobe Steel, from Chemical Abstracts No. 101411b, vol. 95 (1981.09) No. 12, Sep. 21, 1981, p. 219.
*A New Microalloyed Multi–Phase Steel for High Strength Cold Heading Applications* by C. I. Garcia, A. K. Lis and A. J. DeArdo, from Proceedings of the 60th Annual Convention and 1990 Division Meetings of the Wire Association International Inc., May 1990, pp. 26–30.
*Accelerated Cooling: A Physical Metallurgy Perspective* by A. J. DeArdo, from Canadian Metallurgical Quarterly, vol. 27, No. 2, 1988, pp. 141–154.
*The Deformation Behavior of a Vanadium–Strengthened Dual Phase Steel* by R. G. Davies, from Metallurgical Transactions, vol. 9A, Jan. 1978, pp. 41–52.
*Warm Working of Steel* by Isao Gokyu and Teruo Kishi, from Japanese Inst. of Metal vol. 9, Supp. 1968.
*Strengthening of Warm–Rolled Low–Carbon Steels* by M. L. Bernshtein and N. V. Filatova, from 2354 Metal Science and Heat Treatment 26, Feb. 1, 1984, pp. 128–131.
*Materials Science in Engineering*, Second Edition by Carl A. Keyser, 1974, pp. 236–237.
*Warm Extrusion of Free–Cutting Steels* by E. Nehl, from CA102(22): 888 63K American Chem. Society, 1984.

*Primary Examiner*—Deborah Yee
*Attorney, Agent, or Firm*—Wood, Herron & Evans

[57] ABSTRACT

A method of making high-strength steel structural members is disclosed by providing a blank of high-strength steel having a ferrite-pearlite microstructure and high-strength mechanical properties and cold forming the blank by rolling, upsetting, forging, or extrusion to provide a structural member having a desired geometric cross-section while the mechanical strength of the structural member remains substantially the same or greater than the blank.

11 Claims, No Drawings

COLD FORMED HIGH-STRENGTH STEEL STRUCTURAL MEMBERS

RELATED APPLICATIONS

This is a continuation-in-part application of U.S. patent application Ser. No. 07/992,123 filed Dec. 17, 1992 now U.S. Pat. No. 5,330,594 which is in turn a continuation in part application of U.S. patent application Ser. No. 07/848,646, filed Mar. 9, 1992 and now U.S. Pat. No. 5,236,520, which is, in turn, a continuation-in-part application of U.S. patent application Ser. No. 07/602,675, filed Oct. 24, 1990 and now U.S. Pat. No. 5,094,698, all assigned to the assignee of this application.

FIELD OF THE INVENTION

The present invention relates to a method of making high-strength steel structural members, and more particularly, it relates to a method in which a blank of high-strength steel is cold formed into a structural member having a desired geometric cross-section, such that the strength of the member remains substantially the same or greater than the blank.

BACKGROUND OF THE INVENTION

A number of methods have heretofore been used to make steel parts and structural members. These methods often employ cold forming techniques, such as rolling, upsetting, heading and extrusion, which are well known in the art. In upsetting, the cross-sectional area of a portion or all of a blank of metal is increased. Heading is a particular form of upsetting where the blank is a wire, rod or bar stock. The heads of bolts are often made using heading techniques. In extrusion, the metal blank is forced through a die orifice of desired cross-sectional outline to produce a length of uniform cross section. Rolling includes forming a blank by repeatedly passing rollers over the length of the blank until it is formed into the desired shape. Rolling is particularly applicable for forming elongate structural members having a uniform cross-sectional configuration over substantially the entire length of the member.

One such method for making high-strength steel structural members which is well known begins by annealing or otherwise softening the steel blank. The annealed steel blank is then cold formed, in a process which includes one of the above type forming techniques, into a desired geometric cross-section. The now formed structural member is then heat treated, i.e., austenitized, hardened by quenching followed by tempering, to obtain the high-strength mechanical properties desired. The steel material of the resulting member has a tempered martensite microstructure. The mechanical properties produced from such heat treatments are often inconsistent and can vary widely from member to member. In addition, the annealing and heat treating steps significantly add to the cost of the overall process for making the high-strength steel structural members, due in large part to the energy consumption associated with heating the member and the required labor and processing.

In another method for making such high-strength steel structural members, the blank of steel is initially austenitized, hardened by quenching and then tempered to the point where the mechanical properties of the post-heat treated blank are such that the blank can be subsequently cold formed, in a process which includes one of the above forming techniques, into a desired geometric cross-section. The steel material of the finished member from this method also has a tempered martensite microstructure. While this method apparently has advantages over the previously described method in that narrower strength tolerances from member to member have reportedly been obtained, this method still employs a costly heat treating process.

Cold forming blanks of high-strength material is known. In U.S. Pat. No. 3,904,445 issued to the present inventor, a method is disclosed for cold forming a length of high-strength steel bar stock into a U-bolt. The '445 patent discloses such a length of bar stock made of a steel material having a composition consisting essentially of, by weight percent: carbon between about 0.50–0.55%, manganese between about 1.20–1.65%, vanadium between about 0.03–0.05 %, with the balance substantially all iron. However, cold forming a bend in a length of bar stock is less severe than other cold forming techniques, such as upsetting and extruding. Until this invention, it was thought that cold forming a blank of high-strength into a part or structural member by upsetting or extrusion type techniques would likely result in the formation of cracks or even fractures in the finished product or at the least would likely require the gradual formation of the member by a series of cold forming steps with an annealing or stress relieving step performed between successive cold forming operations. Such cracks or fractures would likely ruin the member. In addition, employing such cold forming and annealing steps would add to the time and cost of making such high strength steel structural members.

SUMMARY OF THE INVENTION

There has heretofore been lacking a method of making a high-strength steel structural member from a blank of steel having a ferrite-pearlite microstructure and possessing desired high-strength properties, which method includes a cold forming step whereby the blank is cold formed by rolling, upsetting, forging, or extrusion type techniques into a desired structural member, with the mechanical strength of the member remaining substantially the same or greater than the strength originally possessed by the blank, and with the member produced with the desired high-strength mechanical properties without the need of heat treatment.

The term "blank" as used herein has its usual meaning, i.e., a piece of metal to be formed into a finished member of desired geometric cross-section. Blanks include such pieces of metal as rods, wires, bar stock and cut lengths thereof (i.e., a piece of steel long in proportion to its width or thickness). A blank is differentiated from a structural member in that a structural member has at least one flange included in its cross-sectional configuration. The flange is a member which has a thickness less than an overall outer dimension of the cross-sectional configuration and provides increased load beating capability to the structural member.

The present invention is directed to a method of making high-strength steel structural members from blanks of high-strength steel material having a ferrite-pearlite microstructure and a tensile strength of at least about 120,00 psi and a yield strength of at least about 90,000 psi with the following composition by weight percent: carbon—about 0.30 to about 0.65%, manganese—about 0.30 to about 2.5 %, at least 1 grain refiner from the group consisting of aluminum, niobium (i.e., columbium), titanium and vanadium and mixtures thereof, in an amount effective up to about 0.35 %, and iron—balance.

In one of its aspects, the present invention provides a method of making high-strength steel structural members from such blanks by cold forming the blank using techniques such as rolling, upsetting, forging, or extrusion to provide a member having the desired geometric cross-section with a ferrite-pearlite microstructure, whereby the mechanical properties of tensile strength and yield strength of the member are substantially the same or greater than the blank.

The present invention also provides a method of making high-strength steel structural members which includes cold forming a blank of high-strength steel using such techniques, whereby the mechanical properties of tensile strength and yield strength are substantially the same or greater than the blank and wherein the member, with the desired mechanical properties of tensile strength and yield strength, is produced without the need for further processing steps to improve toughness. Depending at least in part on its geometric cross-section, some members may need to be stress relieved within a temperature range of between about 450° F. to about 1,200° F. in order to raise, lower, or otherwise modify the mechanical properties of the steel member (e.g., tensile strength, yield strength, percent elongation, hardness, percent reduction of area, etc.).

The principles of this invention, its objectives and advantages will be further understood with reference to the following detailed description.

DETAILED DESCRIPTION OF THE INVENTION

The method of the present invention is useful for producing a wide variety of finished high-strength steel structural members. In particular, elongated high strength steel structural members having a uniform cross-sectional configuration over substantially its entire length. For example, structural members having an O, L, C, Z, I, T, W, U, V shapes and other members are susceptible to forming by the cold forming process are described herein.

A blank is distinguished herein from a structural member in that a structural member is elongate with a uniform cross-sectional configuration which includes at least one flange. The flange is a member which has a thickness less than an overall outer dimension of the cross-sectional configuration (i.e., the width, height, or outer diameter of the structural member). The flange distinguishes the structural member from a blank in that the flange provides increased load bearing capability to the member. In other words, the structural member has more load bearing capability with the flange than a member without the flange having the same material composition and properties as the structural member. The load may be axial as in an end-on load, lateral as in a side load or any other type of load applied to the structural member. The flange is integrally formed either continuously or discontinuously with respect to the remainder of the structural member. Examples of discontinuous flanges are the upper and lower portions of an I-shaped beam with respect to the center portion of the I-beam, or of either leg of an L-shaped truss with respect to the other leg of the truss. An example of a continuous flange is any cord or portion of the cross-sectional configuration of an O-shaped structural member. Examples of structural members having at least one flange are O, L, C, Z, I, T, U, V, and W shaped members.

In a preferred embodiment, the method of the present invention for making a high-strength steel structural member includes providing a blank of high-strength steel material having a microstructure of fine pearlite in a ferritic matrix, a tensile strength of at least about 120,000 psi and preferably at least about 150,000 psi, and a yield strength of at least about 90,000 psi, and preferably at least about 130,000 psi. Pearlitic constituents are generally considered to be "fine" when their lamellae are not resolvable at an optical magnification of about 1000 times. In one form, the high-strength steel material utilized as the blank has been hot reduced and cold drawn to provide the blank having the mechanical properties of tensile strength and yield strength stated above.

The high-strength steel material used to make the blank has the following composition, by weight percent:

| | |
|---|---|
| carbon | about 0.30 to about 0.65% |
| manganese | about 0.30 to about 2.5% |
| at least 1 ferrous grain refiner from the group consisting of aluminum, niobium, titanium and vanadium, and mixtures thereof, in an effective amount up to about 0.35% | |
| iron | balance. |

In a more preferred form, the high-strength steel material has the following composition, by weight percent:

| | |
|---|---|
| carbon | about 0.40 to about 0.55% |
| manganese | about 0.30 to about 2.5% |
| at least one ferrous grain refiner from the group consisting of aluminum, niobium, titanium and vanadium and mixtures thereof in an effective amount up to about 0.20% | |
| iron | balance. |

In a still more preferred form, the high-strength steel material has the following composition, by weight percent:

| | |
|---|---|
| carbon | about 0.50 to about 0.55% |
| manganese | about 1.20 to about 1.65% |
| at least 1 ferrous grain refiner from the group consisting of aluminum, niobium, titanium and vanadium, and mixtures thereof, in an effective amount from about 0.03 to about 0.20% | |
| iron | balance. |

While aluminum, niobium (i.e., columbium), titanium and vanadium act as grain refiners, vanadium is the most preferred of the grain refiners. Furthermore, it should be understood that the compositions listed and claimed herein may include other elements which do not impact upon the practice of this invention.

The blank, having a composition and mechanical properties of tensile strength and yield strength as given above is thereafter cold formed using such techniques as upsetting, forging, or extrusion at a temperature between ambient or room temperature up to less than about 300° F., and preferably at about ambient temperature, to provide a member having a desired geometric cross-section, whereby the mechanical properties of tensile strength and yield strength of the member are substantially the same or greater than the blank. The formed member, with the mechanical properties of tensile strength and yield strength given, is preferably produced without the need for further processing steps, such as a final stress relieving step, to improve toughness. However, for certain geometric cross-sections and applications of the member, a stress relieving step may be necessary.

The blank of high-strength steel material having a tensile strength of at least about 120,000 psi and a yield strength of at least 90,000, which is used as the starting piece in the method of the present invention, is produced by any suitable method known in the art. One such method is disclosed in U.S. Pat. No. 3,904,445 to the present inventor and the specification in its entirety is incorporated herein by reference. The '445 patent discloses a processing sequence to produce a high-strength steel bar stock of the type particularly useful for producing threaded fasteners, including U-bolts. In the described process, the bar stock produced has a fine grained structure between about ASTM No. 5-8. In the disclosed process, a steel, having a composition falling within certain disclosed ranges, is subjected to a standard hot reducing operation to within 10%–15% of final gauge. The hot reduced bar stock is then cut or severed into individual lengths for rapid air cooling. Thereafter, the individual lengths of hot reduced bar stock are subjected to a cold finishing to final gauge. The final step is a controlled stress relieving step to increase the mechanical strength properties. This stress relieving step comprises heating the lengths of bar stock to between about 500°–850° F. for about one hour, but may or may not be necessary. Thus, such bar stock, with and without further stress relieving may be used to form the starting high-strength steel blank.

The following example illustrates the practice of the present invention to produce a structural member from high-strength steel bar stock produced in accordance with the method disclosed in U.S. Pat. No. 3,904,445 described above.

EXAMPLE

High-strength 1552 steel I-beam stock had the following composition by weight:

| | |
|---|---|
| Carbon | 0.52% |
| Manganese | 1.43% |
| Phosphorous | 0.009% |
| Sulphur | 0.017% |
| Silicon | 0.22% |
| Vanadium | 0.075% |
| Chromium | 0.05% |
| Molybdenum | 0.01% |
| Iron | balance. |

A center section of the stock had a thickness of 0.177" and each top and bottom flange had a thickness of about 0.16". The overall height of the stock I-beam was 2.64" and the overall width was the same width as each flange, specifically 1.825". A 0.125" radius fillet joined each face of the center section or web to each flange. The I-beam stock was sectioned into approximately 3 foot lengths. The stock was tested to have a tensile strength of 133,000 psi and a yield strength of 89,000 psi.

The I-beam stock was extruded through a tapered die with 65,000 lbs of force at room temperature to cold form a finished I-beam structural member. The cold formed I-beam had an overall width of 1.825" and an overall height of 2.64". A center section of the 1-beam was 0.16" thick and extended between a pair of spaced 0.155" thick top and bottom flanges. Therefore, the thickness of each flange (0.155") is less than an overall outer dimension of the beam, i.e., the width (1.825") or the height (2.64"). A 0.125" radius fillet was formed onto each face of the juncture between the center section or web and the top and bottom flanges. The cold formed I-beam was tested to have a tensile strength of 142,000 psi and yield strength of 118,000 psi.

The mechanical properties of tensile strength and yield strength of the finished I-beam structural member are greater than that originally possessed by the bar stock, and therefore, no further strengthening processing steps are required. The finished member also has enough of the desired mechanical property of ductility originally possessed by the bar stock that the need for further processing steps to improve toughness can generally be eliminated. However, for certain uses of the I-beam structural member, a stress relieving step may be necessary.

Compared to prior methods which used a heat treating process (i.e., austenitizing, hardening by quenching and tempering), especially when the heat treatment was used after cold forming to produce the desired high-strength mechanical properties of the member, finished structural members made according to the present invention are more likely to consistently have mechanical properties which fall within a narrower range. Thus, the present invention is more likely to consistently produce structural members with higher strength levels and within a narrower range.

The scope of the present invention is not intended to be limited by the examples provided herein, but rather as defined by the appended claims.

What is claimed is:

1. A method of making a high-strength steel structural member having a specific uniform cross-sectional configuration comprising the steps of:

providing a blank of high-strength steel material having a ferrite-pearlite microstructure and a tensile strength of at least about 120,000 psi and a yield strength of at least about 90,000 psi that comprises by weight:

| | |
|---|---|
| carbon | about 0.30 to about 0.65% |
| manganese | about 0.30 to about 2.5% |
| at least 1 grain refiner from the group consisting of aluminum, niobium, titanium and vanadium, and mixtures thereof, in an effective amount for grain refiner up to about 0.35% | |
| iron | balance; and | cold forming said blank by rolling, upsetting, forging or extrusion to provide a structural member having a uniform cross-sectional configuration, said uniform cross-sectional configuration including at least one flange having a thickness less than an overall outer perimeter of said cross-sectional configuration, said at least one flange providing increased load bearing capacity to said structural member, whereby the mechanical properties of tensile strength and yield strength of said structural member are substantially the same or greater than said blank.

2. The method of claim 1 wherein said structural member with said mechanical properties is produced without the need for further processing steps to improve toughness.

3. The method of claim 1 wherein the high-strength steel material has previously been hot reduced and cold drawn to provide said blank.

4. The method of claim 1 wherein the blank of high-strength steel material has a tensile strength of at least about 150,000 psi and a yield strength of at least about 130,000 psi.

5. The method of claim 1 wherein the high-strength steel material comprises, by weight percent:

| | |
|---|---|
| carbon | about 0.40 to about 0.55% |
| manganese | about 0.30 to about 2.5% |
| at least one grain refiner from the group consisting of aluminum, niobium, titanium and vanadium and mixtures thereof in an effective amount for grain | |

| | |
|---|---|
| refining up to about 0.20% | |
| iron | balance. |

6. The method of claim 1 wherein the high-strength steel material comprises, by weight percent:

| | |
|---|---|
| carbon | about 0.50 to about 0.55% |
| manganese | about 1.20 to about 1.65% |
| at least one grain refiner from the group consisting of aluminum, niobium, titanium and vanadium, and mixtures thereof, in an amount for grain refining from about 0.3 to about 0.20% | |
| Iron | balance. |

7. The method of claim 1 wherein said cold forming is carried out at ambient temperature up to less than about 300° F.

8. The method of claim 1 wherein said structural member with said mechanical properties is subjected to stress relieving within a temperature range between about 450° F. to about 1,200° F. in order to modify the physical characteristics of said structural member.

9. The method of claim 1 wherein said uniform cross-sectional configuration is selected from the group consisting of O, L, C, Z, I, T, U, V, and W shapes.

10. A method of making a high-strength steel structural member having a specific uniform cross-sectional configuration comprising the steps of:

providing a blank of high-strength steel material having a ferrite-fine pearlite microstructure, a tensile strength of at least about 120,000 psi and a yield strength of at least about 90,000 psi, which material has previously been hot reduced and cold drawn to provide said blank with said high-strength properties, said high-strength steel comprising, by weight percent:

| | |
|---|---|
| carbon | about 0.50 to about 0.55% |
| manganese | about 1.20 to about 1.65% |
| at least one grain refiner from the group consisting of aluminum, niobium, titanium and vanadium, and mixtures thereof, in an effective amount for grain refining up to about 0.20% | |
| iron | balance; and | cold forming said blank by rolling, upsetting or extrusion, at ambient temperature to provide a structural member having a uniform cross-sectional configuration, said uniform cross-sectional configuration including at least one flange having a thickness less than an overall outer perimeter of said cross-sectional configuration, said at least one flange providing increased load bearing capacity to said structural member, said uniform cross-sectional configuration being selected from the group consisting of O, L, C, Z, I, T, U, V, and W shapes, whereby the mechanical properties of tensile strength and yield strength of said structural member are substantially the same or greater than said blank.

11. The method of claim 10 wherein said blank of high-strength steel has a tensile strength of at least about 150,000 psi and a yield strength of at least about 130,000 psi.

* * * * *

UNITED STATES PATENT AND TRADEMARK OFFICE
CERTIFICATE OF CORRECTION

PATENT NO. : 5,496,425
DATED : March 5, 1996
INVENTOR(S) : Hugh M. Gallagher, Jr.

It is certified that error appears in the above-indentified patent and that said Letters Patent is hereby corrected as shown below:

Column 2, Line 53, "beating" should read --bearing--.

Column 3, Line 45, "beating" should read --bearing--.

Column 6, Line 34, "grain refiner" should read --grain refining--.

Column 7, Line 14, "0.3 to about" should read --0.03 to about--.

Signed and Sealed this

Twentieth Day of August, 1996

Attest:

BRUCE LEHMAN

Attesting Officer  Commissioner of Patents and Trademarks